(12) United States Patent
Liu et al.

(10) Patent No.: US 8,535,047 B1
(45) Date of Patent: Sep. 17, 2013

(54) INJECTION MOLD HAVING EXHAUST GROOVES

(75) Inventors: Hai-Ming Liu, Shenzhen (CN); Zheng Jin, Shenzhen (CN); Jie Wu, Shenzhen (CN); Guo-Rong Huang, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 5 days.

(21) Appl. No.: 13/451,794

(22) Filed: Apr. 20, 2012

(30) Foreign Application Priority Data

Feb. 27, 2012 (CN) .......................... 2012 1 0045023

(51) Int. Cl.
*B29C 45/63* (2006.01)
(52) U.S. Cl.
USPC .......................... 425/542; 264/102; 425/812
(58) Field of Classification Search
USPC .................... 425/542, 812; 264/102
See application file for complete search history.

(56) References Cited

U.S. PATENT DOCUMENTS

| | | | | |
|---|---|---|---|---|
| 6,042,354 | A * | 3/2000 | Loren | 425/812 |
| 6,524,519 | B1 * | 2/2003 | Ohba et al. | 425/812 |
| 6,877,974 | B2 * | 4/2005 | Puniello et al. | 425/812 |
| 7,631,851 | B2 * | 12/2009 | Dubay | 425/812 |
| 2008/0211129 | A1 * | 9/2008 | Dubay | 264/102 |

\* cited by examiner

*Primary Examiner* — Tim Heitbrink
(74) *Attorney, Agent, or Firm* — Altis Law Group, Inc.

(57) ABSTRACT

An injection mold comprises a second die, a first die engaging with the second die, and an inclined pin. The first die defines an inclined pin hole. The inclined pin fixed in the inclined pin hole of the first die. The first die comprises a mold core on the first die. The mold core comprises two opposite ends. Each end defines a first exhaust groove. The inclined pin head comprises a second exhaust groove, a recessed portion, and a third exhaust groove. The second exhaust groove, the recessed portion, and the third exhaust groove communicate with the first exhaust groove. The injection mold further comprises a diverting groove located between the inclined pin and the first die, and a guide groove allows the third exhaust groove communicate with the diverting groove.

15 Claims, 8 Drawing Sheets

INJECTION MOLD HAVING EXHAUST GROOVES

BACKGROUND

1. Technical Field

The present disclosure relates to an injection mold.

2. Description of Related Art

During injection molding, the molten plastic molding material must be able to flow in the molding channel. If the flow is not fluent freely, unwanted binding lines may be formed in the final plastic products.

To solve the above problem, an overflow groove may be defined in an end wall of an inclined pin of the injection mold. The width of the overflow groove is about 0.5 mm to about 1 mm. The overflow groove can allow the discharge of gas from the molding channel to avoid the formation of binding lines. However, the overflow forms a flash or excess portion connected to the plastic product, which needs to be removed after injection molding.

Therefore, there is room for improvement within the art.

BRIEF DESCRIPTION OF THE FIGURES

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
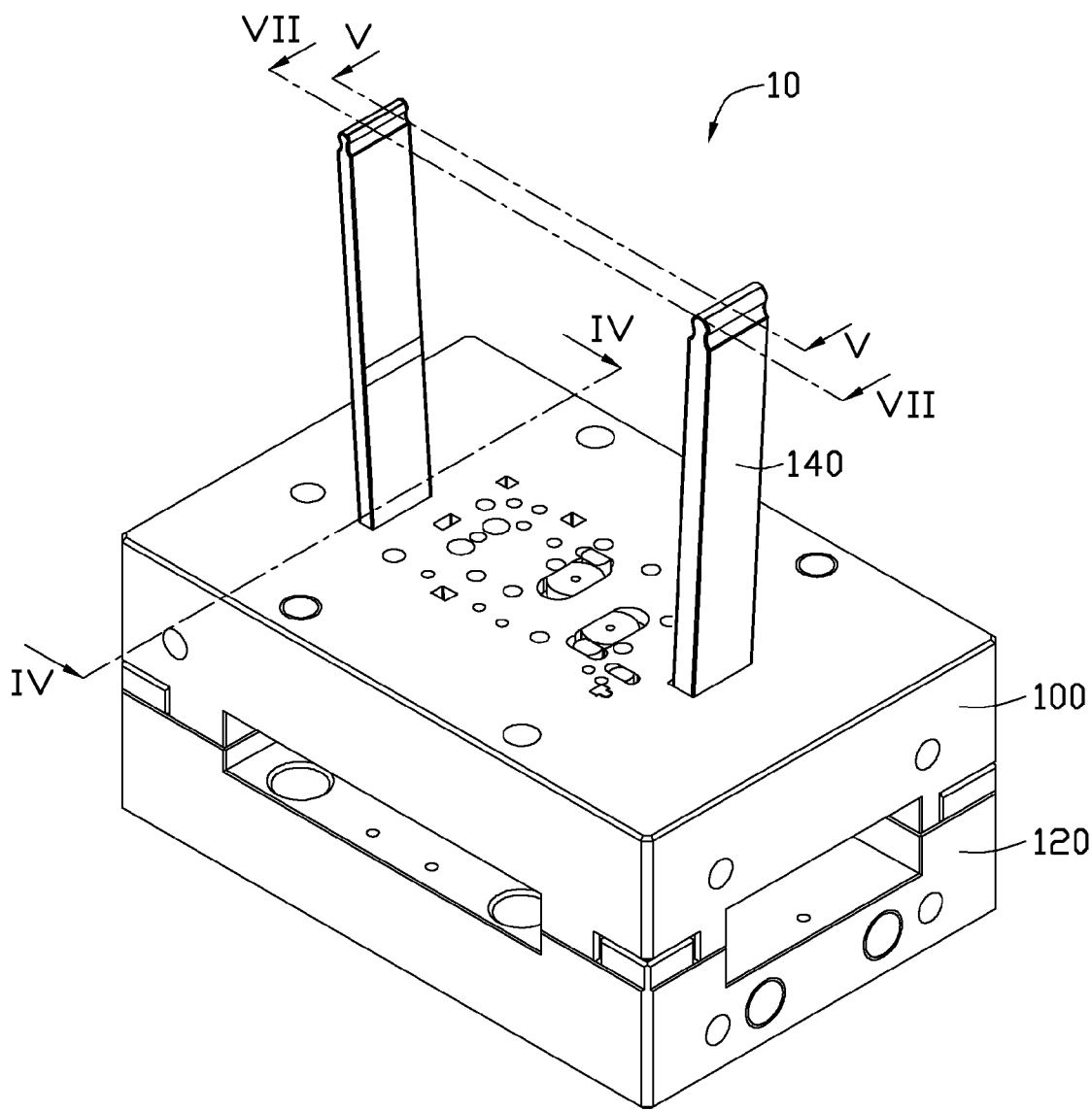
FIG. 1 is an isometric view of an exemplary embodiment of an injection mold.
Figure 2:
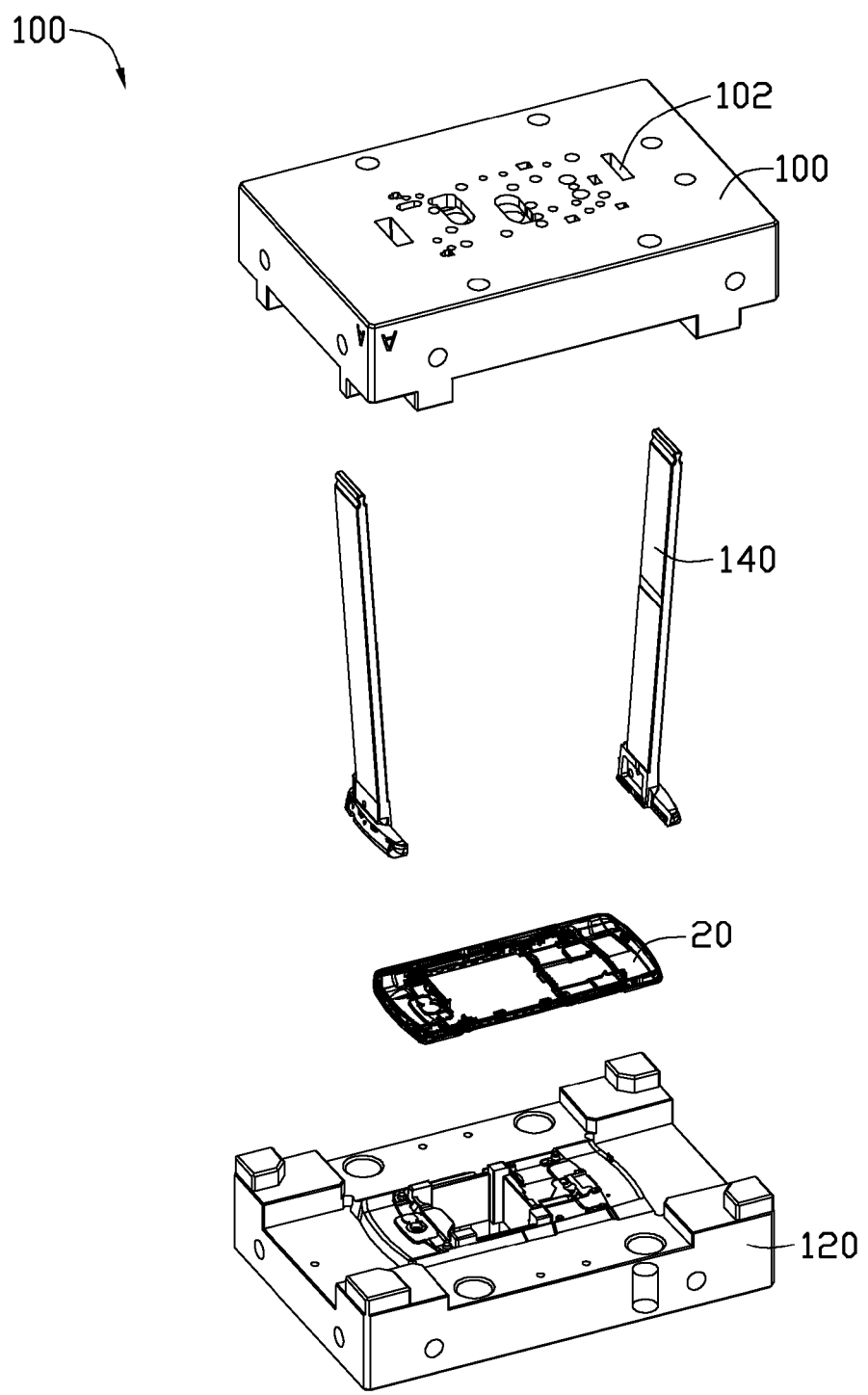
FIG. 2 is an exploded, isometric view of the injection mold of FIG. 1 and plastic article.

FIGS. 1, 2, 5 and 7 show an exemplary injection mold 10 used in forming plastic pieces 20. The injection mold 10 includes a first die 100, a second die 120, two inclined pins 140, and two running channels 160 defined in the second die 120. The inclined pins 140 are fixed to the first die 100. The running channels 160 are used for injecting molding material into the injection mold 10. The second die 120 engages with the first die 100 to form a molding chamber 180 between the first die 100 and the second die 120 (shown in FIG. 7).

The first die 100 defines two inclined pin holes 102. Each inclined pin 140 fixed in one of the inclined pin holes 102. The first die 100 includes a mold core 104 on a surface of the first die 100 facing the second die 120. The mold core 104 includes two opposite ends 106. Each end 106 defines a first exhaust groove 1062 (shown in FIG. 8).

Figure 3:
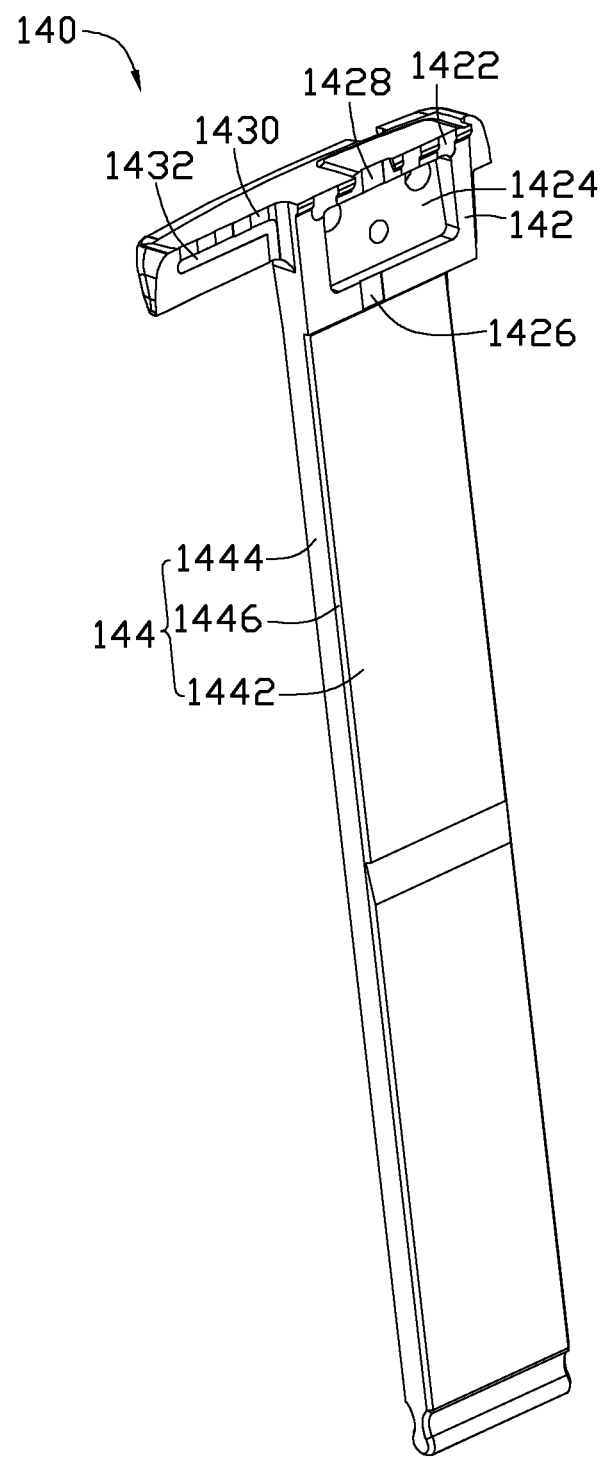
FIG. 3 is an enlarged view of an inclined pin of FIG. 1.

Referring to FIG. 3, the inclined pin 140 includes an inclined pin head 142 and an inclined pin rod 144 connected to the inclined pin head 142. The inclined pin rod 144 passes through the inclined pin hole 102. In this embodiment, the inclined pin 140 is an L-type inclined pin.

Figure 4:
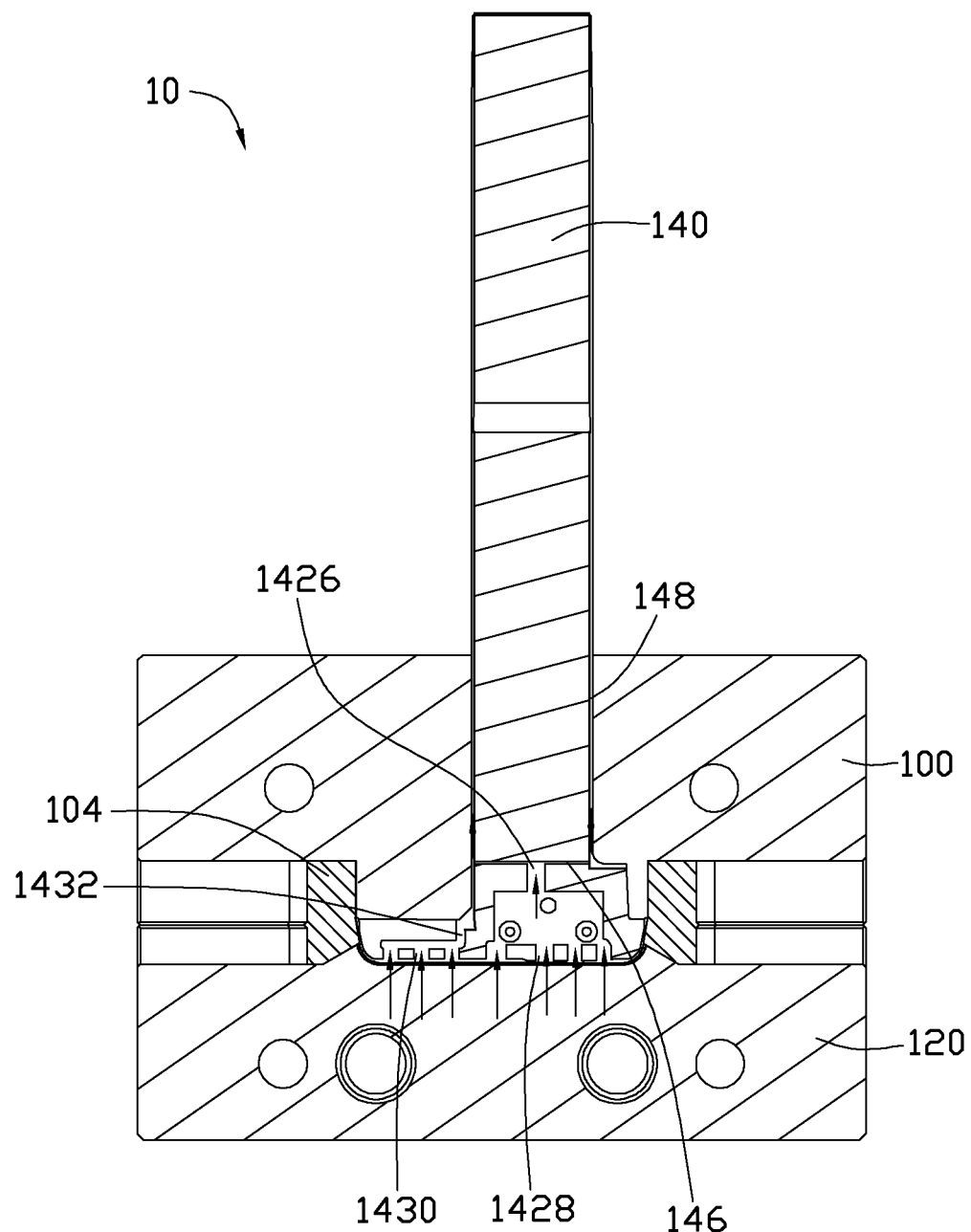
FIG. 4 is a sectional view of a molding tool of FIG. 1 taken along line IV-IV.
Figure 5:
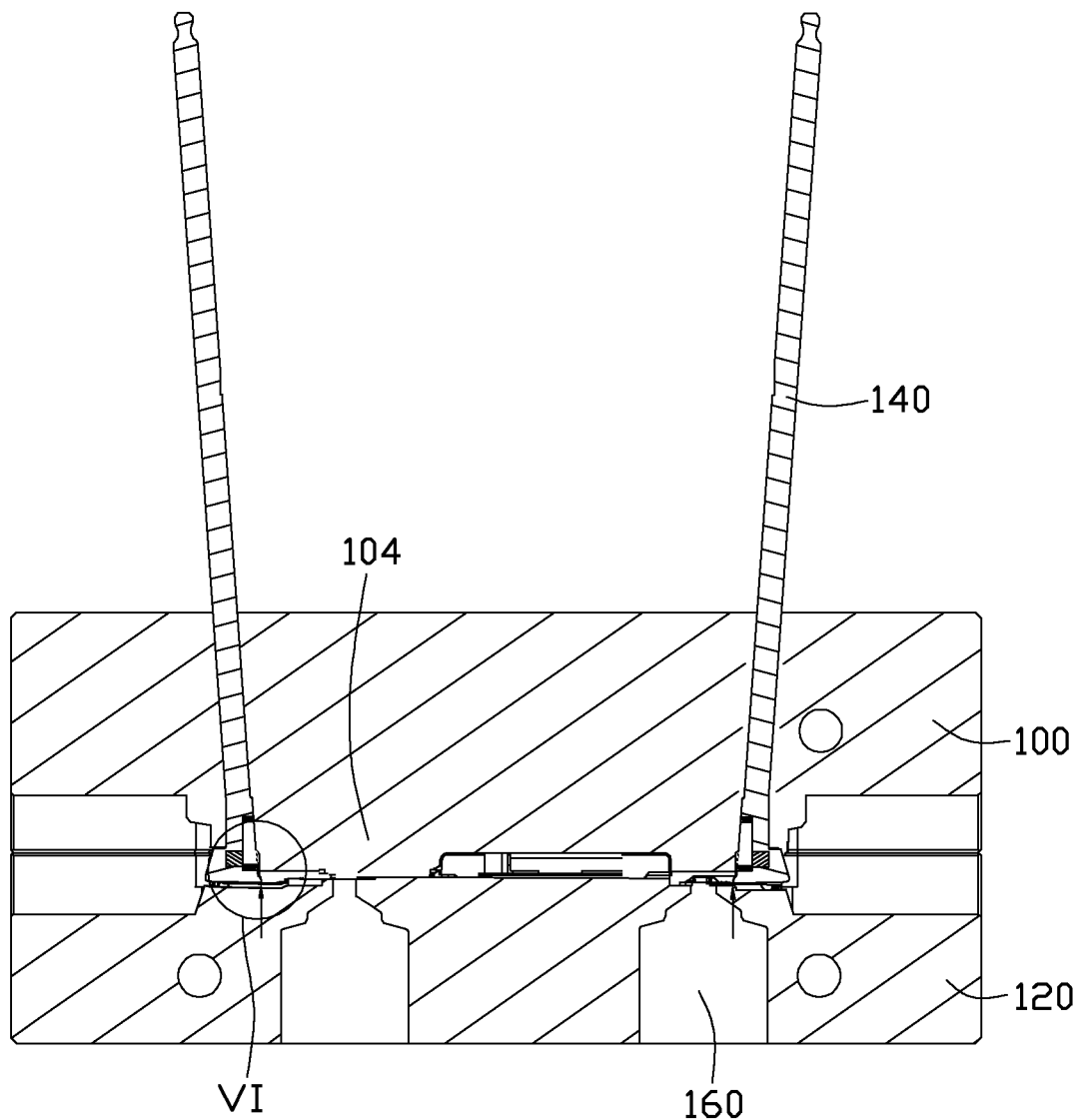
FIG. 5 is a sectional view of a molding tool of FIG. 1 taken along line V-V.

Referring to FIG. 4, the inclined pin head 142 includes two second exhaust grooves 1422, a recessed portion 1424, and a third exhaust groove 1426. The second exhaust groove 1422, the recessed portion 1424, and the third exhaust groove 1426 communicate with the first exhaust groove 1062. The inclined pin rod 144 includes a first surface 1442, two edges 1444 and two chamfer planes 1446 connecting the first surface 1442 with the edge 1444. The injection mold 10 further includes a guide groove 146 formed between the inclined pin head 142 and the inclined pin 140 rod, and a diverting groove 148 located between the inclined pin 140 and the first die 100. The guide groove 146 allows the third exhaust groove 1426 to communicate with the diverting groove 148. During injection molding process, gas within the molding channel 180 passes through the second exhaust groove 1422, the recessed portion 1424, the third exhaust groove 1426, the guiding groove 146 and diverting groove 148 in that order. Then gas is discharged from the molding channel 180 to avoid binding lines formed on the surface of the plastic piece 20. The width of the second exhaust groove 1422 is about 2 mm to about 4 mm. The depth of the second exhaust groove 1422 is about 0.01 mm to about 0.03 mm. The width of the third exhaust groove 1426 is about 2 mm to about 4 mm. The depth of the third exhaust groove 1426 is about 0.05 mm to about 0.2 mm.

Figure 6:
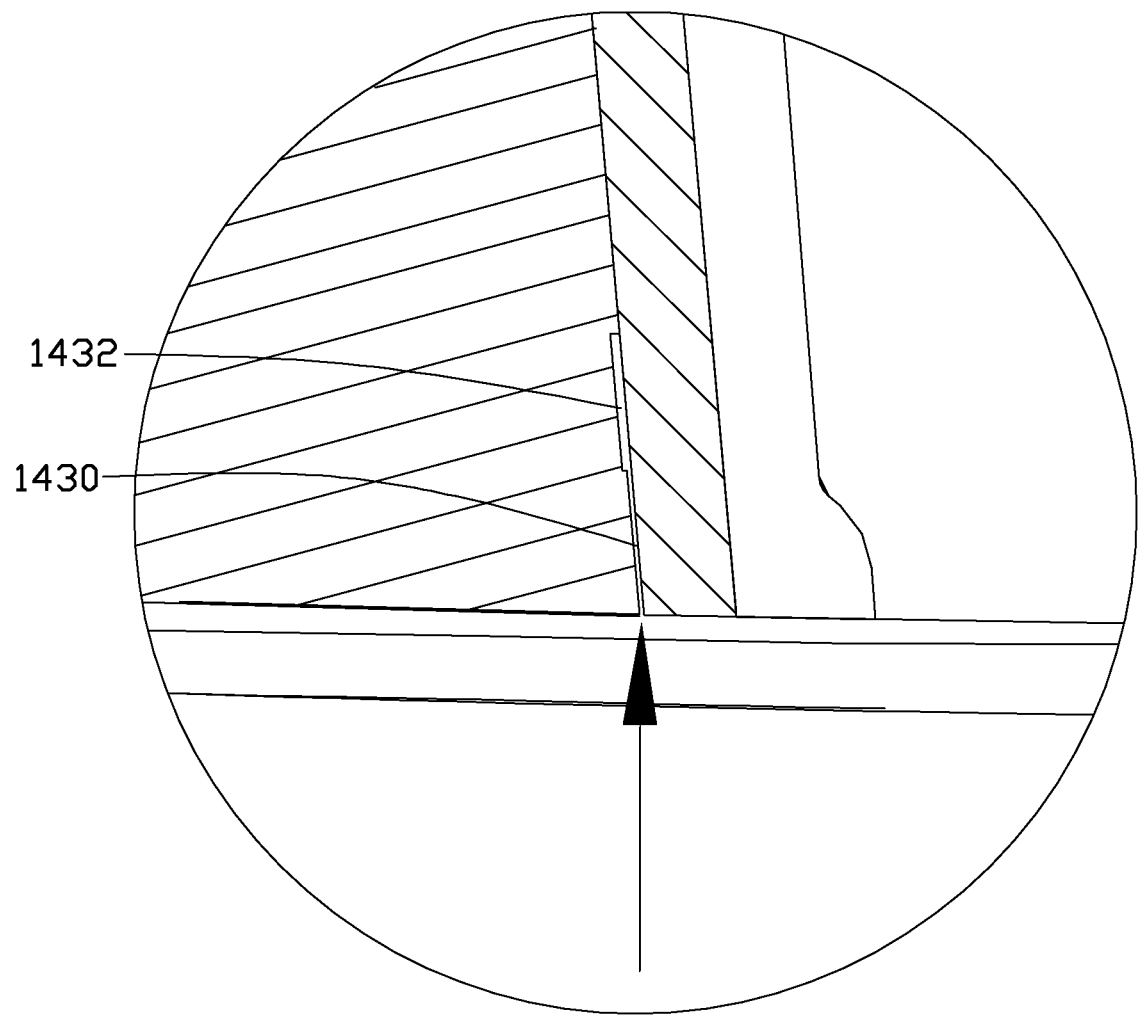
FIG. 6 is an enlarged view of section VI of FIG. 5.
Figure 7:
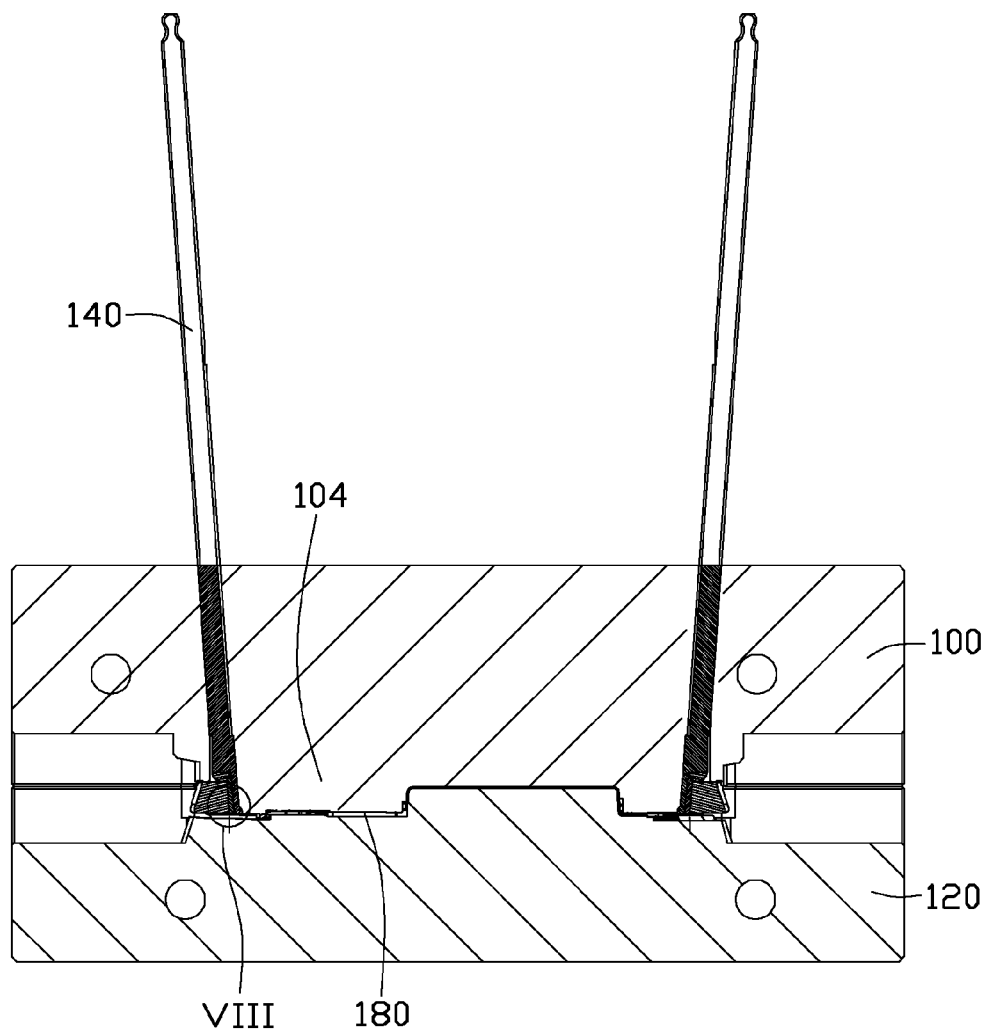
FIG. 7 is a sectional view of a molding tool of FIG. 1 taken along line VII-VII.
Figure 8:
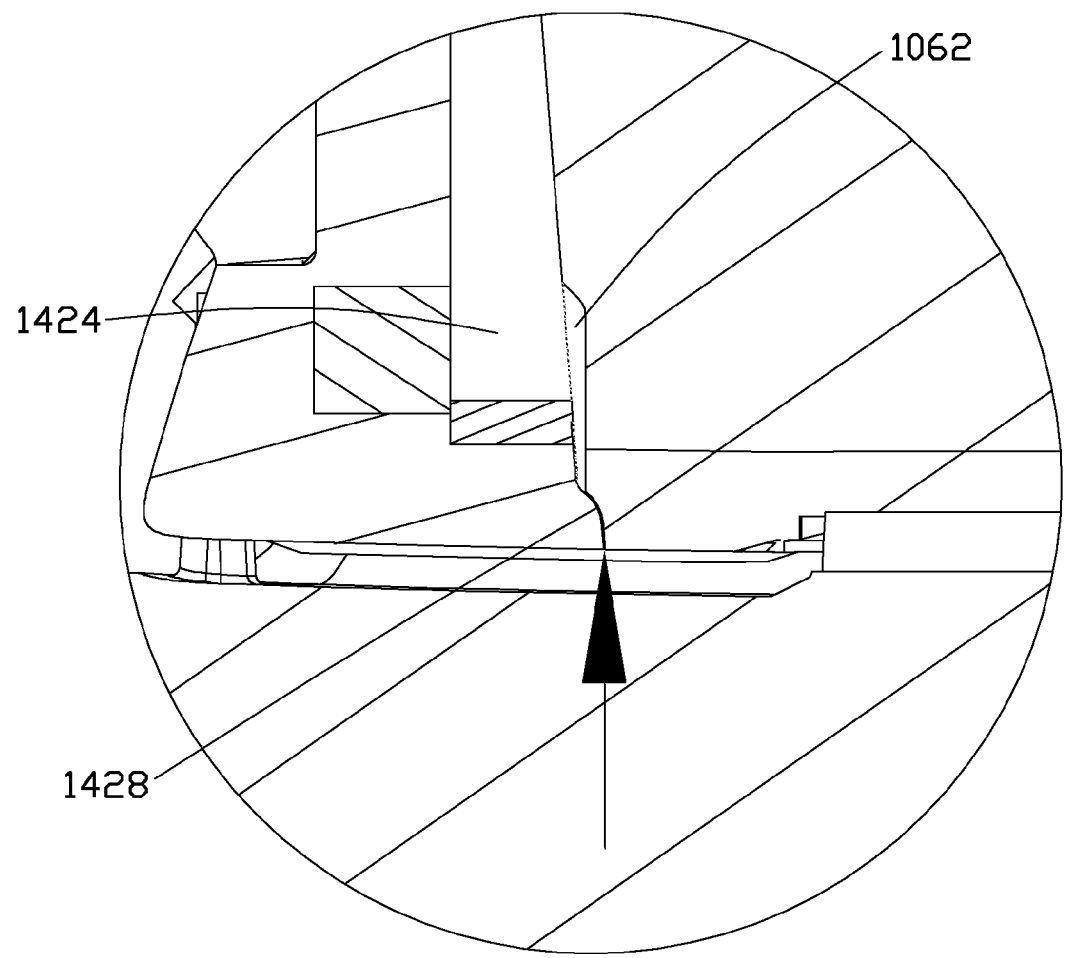
FIG. 8 is an enlarged view of section VII of FIG. 7.

Referring to FIGS. 6, 7 and 8, to enhance the exhaust velocity of the gases from the molding channel 180, the inclined pin head 142 further includes at least one first auxiliary exhaust groove 1428 located between the two second exhaust grooves 1422, and/or at least one second auxiliary exhaust groove 1428 and at least one auxiliary exhaust channel 1422 defined in a surface of the inclined pin head 142. The second auxiliary exhaust groove 1428 and the auxiliary exhaust channel 1422 are located apart from the second exhaust grooves 1422. The first auxiliary exhaust groove 1428 communicates with the recessed portion 1424. The auxiliary exhaust channel 1432, the second exhaust groove 1430, and the diverting groove 148 adjacent to the auxiliary exhaust channel 1432 communicate with each other. Preferably, the number of first auxiliary exhaust grooves 1428 is two; the number of second auxiliary exhaust grooves 1430 is four; and the spacing of the second exhaust groove 1422, the first auxiliary exhaust groove 1428 and the second auxiliary exhaust groove 1430 is substantially uniform on the inclined pin head 142. Accordingly, gas discharging from the molding channel 180 can also exit through the following two ways: first, the gas may pass through the first auxiliary exhaust groove 1428, the recessed portion 1424, the third exhaust groove 1426, the guiding groove 146 and the diverting groove 148 in that order; second, the gas may pass through the first auxiliary exhaust groove 1430, the recessed portion 1424, the third exhaust groove 1426, the guide groove 146 and the diverting groove 148 in that order. The width of the first auxiliary exhaust groove 1428 and the second auxiliary exhaust groove 1430 is about 2 mm to about 4 mm. The depth of the first auxiliary exhaust groove 1428 and the second auxiliary exhaust groove 1430 is about 0.01 mm to about 0.03 mm.

The depth and width of exhaust grooves defined in the injection mold 10 miniscule. Thus, the exhaust grooves such as the second exhaust grooves 1422, third exhaust grooves 1426 and a first auxiliary exhaust grooves 1428 allow only gas to pass through, but prevents the egress of the injection molding material. Accordingly, gas is discharged from the molding channel 180 before the gas pressure within the mold builds up, thereby avoiding binding lines formed on the surface of the plastic piece 20 and the formation of excess portions connected to the plastic piece 20. Additionally, the location of the exhaust grooves, and the exhaust channels substantially in the middle of the molding channel 180 enhances the gas exhausting capabilities of the molding channel 180. The size of the grooves, exhaust grooves or channels is not changed by any changes to the clamping force applied to the injection mold 10.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. An injection mold, comprising:
    a first die, the first die defining an inclined pin hole, the first die comprising a mold core, the mold core defining two first exhaust grooves at two opposite ends of the mole core;
    a second die, the mold core fixed on a surface of the first die facing the second die; and
    an inclined pin fixed in the inclined pin hole of the first die;
    wherein the inclined pin comprises an inclined pin head and an inclined pin rod connected to the inclined pin head, the inclined pin head comprises a second exhaust groove, a recessed portion, and a third exhaust groove; the second exhaust groove, the recessed portion, and the third exhaust groove communicate with the first exhaust groove; the inclined rod comprises a first surface, a edge and a chamfer plane connected the first surface with the edge; the injection mold further comprises a diverting groove located between the inclined pin and the first die and a guide groove located between the inclined pin head and the inclined pin rod; the guide groove allows the third exhaust groove to communicate with the diverting groove.

2. The injection mold as claimed in claim 1, wherein the width of the second exhaust groove is about 2 mm to about 4 mm.

3. The injection mold as claimed in claim 1, wherein the depth of the second exhaust groove is about 0.01 mm to about 0.03 mm.

4. The injection mold as claimed in claim 1, wherein the width of the third exhaust groove is about 2 mm to about 4 mm.

5. The injection mold as claimed in claim 1, wherein the depth of the third exhaust groove is about 0.05 mm to about 0.2 mm.

6. The injection mold as claimed in claim 1, wherein the inclined pin head further comprises at least one first auxiliary exhaust groove located between the two second exhaust grooves, the first auxiliary exhaust grooves communicate with the recessed portion.

7. The injection mold as claimed in claim 6, wherein there are two first auxiliary exhaust grooves.

8. The injection mold as claimed in claim 7, wherein the second exhaust groove and the first auxiliary exhaust groove is uniform on the inclined pin head.

9. The injection mold as claimed in claim 6, wherein the width of the first auxiliary exhaust groove is about 2 mm to about 4 mm.

10. The injection mold as claimed in claim 6, wherein the depth of the first auxiliary exhaust groove is about 0.01 mm to about 0.03 mm.

11. The injection mold as claimed in claim 6, wherein the inclined pin head further comprises at least one second auxiliary exhaust groove and at least one auxiliary exhaust channel defined in a surface of the inclined pin head; the second auxiliary exhaust groove and the auxiliary exhaust channel are located apart from the second exhaust grooves; the auxiliary exhaust channel, the second exhaust groove, and the diverting groove adjacent to the auxiliary exhaust channel communicate with each other.

12. The injection mold as claimed in claim 11, wherein the width of the second auxiliary exhaust groove is about 2 mm to about 4 mm.

13. The injection mold as claimed in claim 11, wherein the depth of the second auxiliary exhaust groove is about 0.01 mm to about 0.03 mm.

14. The injection mold as claimed in claim 11, wherein there are four second auxiliary exhaust grooves.

15. The injection mold as claimed in claim 1, wherein the inclined pin is an L-shaped inclined pin.

* * * * *